UNITED STATES PATENT OFFICE.

CARLETON B. HUTCHINS, OF ANN ARBOR, MICHIGAN.

IMPROVED COMPOSITION FOR ARTIFICIAL STONE.

Specification forming part of Letters Patent No. 85,667, dated January 5, 1869.

*To all whom it may concern:*

Be it known that I, CARLETON B. HUTCHINS, of Ann Arbor, in the county of Washtenaw, in the State of Michigan, have invented an Improved Composition for Concrete Stone; and I do hereby declare that the following is a full and exact description thereof.

The nature of my invention consists in the compounding of ingredients for concrete stone.

To enable others skilled in the art to compound my invention, I will proceed to describe the compounding of the same.

I take one pound of pure rosin; one pound of leached ashes or soft adhesive stone ground; four pounds of sifted gravel or sand; from two to four ounces of linseed-oil.

I pound the rosin up fine. I heat the gravel or sand, or not, as is convenient, before putting it with the rosin. I then put all into a kettle and heat it slowly until the rosin is melted thoroughly, and then I stir until all is well mixed. I am careful not to heat the ingredients hot enough to injure the oil.

The linseed-oil can be diminished or increased to make the composition suitable to work.

After having melted all thoroughly I pour it into a mold of the desired size, and there let it remain until cool, and then, upon removing the mold, I have my concrete stone.

What I claim as my invention, and desire to secure by Letters Patent, is—

The compounding of ingredients, as herein described, to make a composition for concrete stone, as before described.

December 8, 1868.

C. B. HUTCHINS.

Witnesses:
H. B. HUTCHINS,
JOHN I. THOMPSON.